United States Patent
Lindner et al.

(10) Patent No.: US 10,693,331 B2
(45) Date of Patent: Jun. 23, 2020

(54) SYNCHRONOUS MACHINE WITH MAGNETIC ROTATING FIELD REDUCTION AND FLUX CONCENTRATION

(71) Applicants: Jürgen Lindner, Worms (DE); Michael Prokopp, Worms (DE); Thomas Hames, Worms (DE); Hasan Basri Kayakiran, Istanbul Bostanci (TR)

(72) Inventors: Jürgen Lindner, Worms (DE); Michael Prokopp, Worms (DE); Thomas Hames, Worms (DE); Hasan Basri Kayakiran, Istanbul Bostanci (TR)

(73) Assignee: EMF 97 Elektro-Maschinen-Vertrieb-Magnettechnik-und Forschungs-GmbH, Worms (DE)

(*) Notice: Subject to any disclaimer, the term of this patent is extended or adjusted under 35 U.S.C. 154(b) by 0 days.

(21) Appl. No.: 16/422,289

(22) Filed: May 24, 2019

(65) Prior Publication Data
US 2019/0280540 A1 Sep. 12, 2019

Related U.S. Application Data

(63) Continuation of application No. PCT/EP2017/079904, filed on Nov. 21, 2017.

(30) Foreign Application Priority Data
Nov. 25, 2016 (DE) .......................... 10 2016 122 794

(51) Int. Cl.
*H02K 21/24* (2006.01)
*H02K 1/27* (2006.01)
(Continued)

(52) U.S. Cl.
CPC .......... *H02K 1/2766* (2013.01); *H02K 1/278* (2013.01); *H02K 1/2713* (2013.01); *H02K 16/00* (2013.01); *H02K 21/14* (2013.01); *H02K 21/24* (2013.01)

(58) Field of Classification Search
CPC ........ H02K 1/27; H02K 1/271; H02K 1/2713; H02K 1/276; H02K 1/2766; H02K 1/278;
(Continued)

(56) References Cited

U.S. PATENT DOCUMENTS 7,755,243 B2* 7/2010 Mizutani ................ H02K 21/16
310/156.53
8,648,514 B2* 2/2014 Arita ...................... H02K 21/44
310/181

(Continued)

FOREIGN PATENT DOCUMENTS

| CN | 1667922 A | 9/2005 |
| CN | 103312066 A | 9/2013 |

(Continued)

*Primary Examiner* — Tran N Nguyen
(74) *Attorney, Agent, or Firm* — Reinhart Boerner Van Deuren P.C.

(57) ABSTRACT

A synchronous machine with flux concentration. The synchronous machine enables improved torquing characteristics with a simple structure in that at least one additional permanent magnet is provided in the rotor and/or stator, whose generated magnetic flux is at least partially returned via the flux guide regions of the rotor, wherein the magnetic flux of the additional permanent magnet in the flux guide regions of the rotor has a direction opposite to the magnetisation direction of the permanent magnets of the rotor.

15 Claims, 6 Drawing Sheets

(51) Int. Cl.
*H02K 16/00* (2006.01)
*H02K 21/14* (2006.01)

(58) Field of Classification Search
CPC ...... H02K 16/00; H02K 21/04; H02K 21/046; H02K 21/14; H02K 21/16; H02K 21/24
See application file for complete search history.

(56) References Cited

U.S. PATENT DOCUMENTS

| | | | |
|---|---|---|---|
| 2002/0047431 A1* | 4/2002 | Fukushima | H02K 1/2733 310/156.47 |
| 2005/0099082 A1 | 5/2005 | Nashiki | |
| 2008/0218023 A1* | 9/2008 | Niguchi | H02K 1/278 310/156.55 |
| 2010/0019606 A1 | 1/2010 | Mizutani et al. | |
| 2010/0176679 A1 | 7/2010 | Ichiyama | |
| 2012/0139379 A1 | 6/2012 | Ge et al. | |
| 2014/0125181 A1* | 5/2014 | Kou | H02K 21/046 310/156.02 |
| 2014/0361646 A1* | 12/2014 | Saito | H02K 3/28 310/51 |

FOREIGN PATENT DOCUMENTS

| | | | |
|---|---|---|---|
| CN | 104795956 A | 7/2015 | |
| CN | 205725388 U | 11/2016 | |
| DE | 41 15 887 A1 | 12/1991 | |
| DE | 11 2014 006 360 T5 | 11/2016 | |
| EP | 2 639 936 A1 | 9/2013 | |
| JP | 2006271031 | * 10/2006 | ............. H02K 21/16 |

* cited by examiner

SYNCHRONOUS MACHINE WITH MAGNETIC ROTATING FIELD REDUCTION AND FLUX CONCENTRATION

CROSS-REFERENCE TO RELATED PATENT APPLICATIONS

This patent application is a continuation of PCT/EP2017/079904, filed Nov. 21, 2017, which claims priority to German Application No. 10 2016 122 794.3, filed Nov. 25, 2016, the entire teachings and disclosure of which are incorporated herein by reference thereto.

FIELD

The invention relates to a synchronous machine with flux concentration having at least one stator with a polyphase, preferably three-phase, winding with a number of poles $2p \geq 4$, wherein the number of poles is twice the number of pole pairs p and the winding is arranged in n grooves in the stator and is designed to generate a magnetic rotating field, having flux guide regions provided between the grooves of the at least one stator for guiding the magnetic rotating field, which comprise a ferromagnetic, preferably soft-magnetic, material, having at least one rotor arranged on an axis of rotation, which is, relative to at least one stator, rotatably arranged forming an air gap and has regions with permanent magnets facing towards at least one stator and arranged evenly distributed in angular ranges in the circumferential direction with respect to the direction of rotation of the rotor, wherein the permanent magnets are magnetised in the direction of the flux guide regions of the at least one stator or in the opposite direction thereto, the at least one rotor has flux guide regions arranged between the permanent magnets, which serve to guide the magnetic flux from or into the at least one rotor, wherein the flux guide regions of the at least one rotor comprise a ferromagnetic, preferably soft-magnetic, material.

BACKGROUND

Generic permanently excited synchronous machines are known from the prior art. They are commonly used for small to medium power requirements and can operate as generators for power generation and as synchronous motors. However, even higher outputs are increasingly being realised. For example, wind turbines are sometimes equipped with permanently excited synchronous machines. Permanently excited synchronous machines have a rotor, which has permanent magnets magnetised in the direction of the flux guide regions of the stator or in the opposite direction. If the winding of the stator generates a magnetic field, the poles of the permanent magnets are correspondingly drawn to the poles of the rotating field, so that opposing magnetic poles always face each other. The torque of the synchronous machine is thus generated in that the magnetic poles of a rotatably mounted, permanently excited rotor follow a magnetic rotating field generated in the stator.

From US 2010/019606 A1 an electric motor with a stator and a rotatably arranged rotor with axially spaced rotor cores is known, wherein rotor teeth and radially magnetised permanent magnets are alternately arranged on the rotor cores. The document US 2005/099082 A1 concerns an AC synchronous motor comprising a rotor with a plurality of circumferentially arranged permanent magnets as well as a stator with a plurality of stator poles.

The document DE 41 15 887 A1 reveals an electric machine with a stator and a rotor fitted with permanent magnets, wherein the magnetic flux can be changed with the aid of a control coil and thus an appropriate control or regulation can be carried out for different loads and/or operating speeds.

From document US 2010/176679 A1 an electric motor with a rotor, an exciter part and an armature, which has armature windings that are arranged circumferentially facing a rotor and serve to control the magnetic flux, is known.

The torque is usually dependent on the phase angle between the rotor and the magnetic rotating field, wherein the maximum value itself depends on the maximum magnetizability of the permanent magnets. When using, for example, neodymium permanent magnets, the maximum magnetic flux density in the usual temperature range for electric motors is up to 150° C. at approximately 1.4 T, which permanent magnets can provide. The provision of torques was previously limited with a constant overall size, due to the maximum flux densities provided by the permanent magnets.

However, there is a constant need to increase the achievable/usable torque of the synchronous machine in order to, for example, reduce the overall size, to reduce costs or to allow completely new applications on the basis of higher torques.

The present invention therefore has the object of providing a permanently excited synchronous machine with a flux concentration, which can provide improved characteristics with respect to the provision of torque, in a simple design.

BRIEF SUMMARY

The object indicated is achieved according to the teaching of the present invention for a generic synchronous machine in that at least one additional permanent magnet is provided, whose generated magnetic flux is at least partially guided via the flux guide regions of the rotor, wherein the magnetic flux of the additional permanent magnet in the flux guide regions of the rotor has a direction opposite to the magnetisation direction of the permanent magnets of the rotor.

With the at least one permanent magnet additionally provided, an additional magnetic flux is generated in the flux guide regions of the rotor, which is directed counter to the magnetisation direction of the permanent magnet. In the flux guide regions of the rotor, which already return the magnetic flux generated by the permanent magnets from the rotor, this additionally increases the flux density. At the same time, the magnetic flux of the permanent magnets ensures that the magnetic flux issuing from the flux guide regions is displaced and concentrated on the regions of the flux guide regions of the rotor, i.e. a flux concentration is brought about. As a result of the additionally provided flux density of the at least one permanent magnet, a flux density can be achieved in the flux guide regions of the rotor, which is significantly above the remanence of the regions with permanent magnets of approximately 1.4 T. This therefore results in a higher overall magnetisation of the rotor, so that the torque can be significantly increased with otherwise the same design.

The number of magnetic poles of the magnetic rotating field $2p_2$ is twice the number of grooves n, and the number of poles of the magnetic poles of the rotor is $2p_3$: $2p_3 = 2p_2 - 2p$. By selecting a corresponding number of magnetic poles of the rotor, for example $2p_3 = 44$ in a winding with a number of poles 2p of 4, a synchronous machine with high magnetic rotation field reduction and high torque can be provided. For example, a reduction by a factor of 11 is achieved in the example mentioned and at the same time very high torques are provided. This can use the flux density increase according to the invention particularly efficiently for torque increase.

The additional at least one permanent magnet can be arranged, for example, in the rotor, in the stator or also in the housing of the synchronous machine, the only decisive factor is that the magnetisation and flux guidance of the additional permanent magnet generates an additional flux in the flux guide regions of the rotor opposite to the magnetisation direction of the permanent magnet provided in the rotor.

Preferably, the winding of the at least one stator is configured as a three-phase winding and thus has exactly three phases. This makes it possible to operate the synchronous machine in a simple manner with a three-phase current. However, it is also readily possible to operate the synchronous machine, even with a three-phase winding with variable frequency, via an inverter.

In order to achieve good magnetisation with the lowest possible losses, the flux guide regions in the stator and/or rotor are of a laminated design. Laminated design means that the regions guiding the magnetic flux are provided by individual metal sheets electrically insulated from each other, and for example comprise electrical steel sheet. Electrical steel sheet refers to a steel that has particularly good soft-magnetic properties. The flux guide regions of the present invention are preferably provided from electrical steel sheet.

For example, iron-silicon alloys with up to 3% silicon can be used for the laminated regions, which allow a particularly high magnetisation in the saturation region and at the same time require very low coercive force for the polarity reversal. By using these materials in the rotor and/or stator of the synchronous machine, the magnetic losses can be reduced.

Preferably, the number of holes q of the winding of the stator is at least 1.5. The number of holes q is defined by:

$$q = \frac{n}{2p*m},$$

wherein n is the number of grooves, 2p is the number of poles of the winding and m is the number of strands or phases of the winding. The larger the number of holes q, the better the behaviour of the synchronous machine with respect to undulations of the torque in a revolution of the motor. However, numbers of holes of greater than 4 are difficult to realise in production. Numbers of holes of 3 and 4 represent a compromise in the direction of the least possible fluctuating torque of the engine. A manufacturing optimum with simultaneously moderate torque smoothing is achieved at q=2.

The synchronous machine according to the invention can be designed, for example, with a rotor in the form of a cylindrical armature or with a rotor in the form of a disc armature with stators adapted thereto. Firstly, the variants with a cylindrical armature will be explained in more detail below.

According to a further embodiment of the synchronous machine according to the invention, the at least one rotor is designed as a cylindrical armature having an axis of rotation and the at least one stator is designed to generate a radially directed magnetic rotating field in the at least one rotor, wherein the at least one rotor has permanent magnets in a first axial region which are provided in predetermined angular ranges on the lateral surface of the at least one rotor and extend in the axial direction of the at least one rotor, wherein the permanent magnets of the at least one rotor are magnetised in the radial direction or opposite thereto, and between the permanent magnets of the at least one rotor flux guide regions are respectively provided, which form an air gap to the flux guide regions of the at least one stator in the radial direction. This design of the synchronous machine makes it possible to provide additional permanent magnets in a particularly simple manner, which are arranged in the rotor and serve to increase the flux density in the flux guide regions. It has been found that with this variant of the synchronous machine, an improved behaviour can be achieved in that the width of the permanent magnets extending in the axial direction is approximately twice the thickness of the permanent magnets.

Preferably, in this embodiment, the flux guide regions are designed such that they are laminated perpendicular to the axis of rotation of the rotor.

According to a further embodiment of the synchronous machine according to the invention, distributed angular ranges with permanent magnets are provided in the stator, which are magnetised in the direction of the rotor or opposite thereto and are arranged adjacent to flux guide regions of the stator. By means of these permanent magnets provided adjacent to the flux guide regions of the stator, a further magnetic flux concentration of the magnetic rotating field to the flux guide regions is achieved and the leakage flux is reduced. This contributes to increasing the torque of the synchronous machine.

The previously described embodiment can be further improved in that the at least one rotor has at least two axial regions, wherein permanent magnets are provided in at least one first axial region, which extend in the axial direction and are magnetised in the radial direction or opposite thereto, in predetermined angular ranges in the circumferential direction, and between the permanent magnets flux guide regions are respectively provided, wherein permanent magnets are provided in at least one second axial region, which extend in the axial direction and are magnetised in the radial direction or opposite thereto, in predetermined angular ranges in the circumferential direction, and between the permanent magnets flux guide regions are respectively provided, wherein the magnetisation direction of the permanent magnets is opposite to the magnetisation direction of the permanent magnets arranged in the first axial region, and the permanent magnets of the at least one second axial region are arranged in angular ranges in the circumferential direction in which flux guide regions are provided in the first axial region, wherein the flux guide regions of the axial regions of the at least one rotor form an air gap to the at least one stator.

By using a plurality of axial regions in the rotor, it is achieved that additional magnetic flux can be used in the two axial regions via a permanent magnet arranged, for example, in the rotor. With this embodiment, the synchronisation and the torque of the synchronous machine according to the invention can be improved simultaneously. For this purpose, the angular ranges with permanent magnets of the first and second axial region are preferably arranged so as to be rotated relative to one another around exactly the angular range of the flux guide regions, in order to achieve optimal synchronisation and maximum torque.

A further improvement of the last-described two variants can be achieved in that at least one additional permanent magnet is provided in at least one further axial region, which directly adjoins the first or second axial region in the axial direction and/or is arranged between the first and second axial region, said permanent magnet being magnetised in the axial direction, so that a magnetic flux is generated in the flux guide regions of the first or second axial region opposite to the magnetisation direction of the permanent magnets, wherein the axis of rotation consists of non-ferromagnetic material and the at least one further axial region is optionally disc-shaped. In this way it can be achieved that additional magnetic flux can be guided in a simple manner via the flux guide regions of the respective axial regions of the rotor and can contribute to increasing the flux density to up to 2.4 T in the flux guide regions. The guiding of the magnetic flux via the flux guide regions of the axial regions of the rotor is improved by the axis of rotation consisting of non-ferromagnetic material, for example comprising non-magnetisable stainless steel, since short-circuiting of the flux lines of the permanent magnet is largely suppressed via the axis of rotation. The arrangement of the disc-shaped and axially magnetised permanent magnet between two correspondingly formed, as stated above, axial regions of the rotor allows a significant reduction of leakage flux and allows the use of the generated magnetic flux of the disc-shaped permanent magnet to increase the flux density in the flux guide regions of the first and second axial region of the rotor. It is preferable that the at least one additional permanent magnet is a rare-earth permanent magnet, for example a permanent magnet comprising neodymium.

Preferably, the surface of the at least one disc-shaped permanent magnet corresponds to the surface of the exit/entrance surface of the flux guide regions of the adjacent first or second axial region, so that nearly a doubling of the magnetisation of the flux guide regions to up to 2.4 T can be achieved. In addition, the thickness of the disc-shaped permanent magnet is preferably 10 to 30 times the air gap between the rotor and the stator, most preferably 20 times the air gap. This has a positive effect on the reduction of leakage flux.

According to a further alternative embodiment of the synchronous machine according to the invention with a cylindrical rotor, a permanent magnet is provided in at least one first or/and second axial region of the rotor, which is designed as a cylindrical sleeve or tube, magnetised in the radial direction, wherein the sleeve-shaped or tubular permanent magnet has a smaller radius than the rotor itself and is magnetised in the opposite radial direction to the magnetisation direction of the permanent magnets arranged on the lateral surface of the rotor, wherein optionally the axis of rotation of the rotor comprises ferromagnetic material. Analogous to the previously described embodiment, in this alternative embodiment, additional magnetic flux is generated by the radially magnetised, sleeve-shaped or tubular permanent magnets, which causes an increase of the flux density in the flux guide regions of the rotor. If the sleeve-shaped or tubular permanent magnets are arranged directly on the axis of rotation, then the axis of rotation must be made of ferromagnetic material in order to allow a flux return. But it is also conceivable to arrange the sleeve-shaped or tubular permanent magnets using a ferromagnetic sleeve on an axis of rotation made of non-ferromagnetic material.

The lateral surface of the sleeve-shaped or tubular permanent magnet preferably has, on the side facing outward, a large outer surface which is substantially of identical size as the surface of the flux guide regions of the axial section. The thickness of the tubular or sleeve-shaped permanent magnets is preferably approximately 10-30 times, preferably 20 times, the air gap between the rotor and the stator, i.e. the distance of the flux guide regions of the respective stator and of the respective rotor, in order to reduce the leakage flux.

The embodiment can be improved according to a further design in that the respective axial regions of the at least one rotor are arranged separated from one another in the axial direction by a gap of width d. The width d of the gap is preferably 10 to 30 times the air gap between the respective rotor and stator, preferably 20 times the air gap. This measure serves to reduce the leakage flux from the axial region in the inner permanent magnets.

In the following, the embodiment having at least one rotor as a disc armature will be described.

This advantageous embodiment of the synchronous machine is achieved in that at least one rotor is designed as a disc armature and has a plurality of angular ranges in which permanent magnets are provided, wherein the permanent magnets are magnetised in the axial direction and extend in the radial direction on the rotor disc, the winding of the at least one stator has a winding surface normal pointing in the axial direction, so that the at least one stator generates a magnetic rotating field with poles pointing in the axial direction, and at least one additional permanent magnet is provided, which is magnetised in the axial direction and provides magnetic flux in the region of the disc armature, wherein the axis of rotation and a housing cover of the synchronous machine, said housing cover extending in an axial direction, are made of non-ferromagnetic material and the at least one disc armature and at least one stator are arranged between two flux guide plates extending in the radial direction, which are provided for flux guidance of the magnetic flux of the additional permanent magnet.

Disc armatures can be made particularly compact and thus have an advantageous design. By the arrangement of permanent magnets, which extend in the radial direction on the rotor disc, high densities of magnetically active material can be achieved on the disc armature. By the additionally provided permanent magnets, analogous to the previous embodiments, an additional magnetic flux is generated in the flux guide regions, which is directed opposite to the magnetisation direction of the permanent magnets. Thus, the flux guide plates enclosing the at least one disc armature and the at least one stator very effectively introduce the magnetic flux generated by the additional permanent magnet into the radial planes of the disc armature and lead to a significant increase in the flux density in the flux guide regions of the disc armature, up to the saturation limit of the material used. As a result, a significant increase in torque is achieved. In that the axis of rotation and a housing cover of the synchronous machine, said housing cover extending in the axial direction, are made of non-ferromagnetic material, it is achieved that, with respect to the flux guide in the synchronous machine having disc armatures, no flux feedback occurs via the housing or via the axis of rotation and almost the entire magnetic flux of the additional permanent magnet penetrates the radial surfaces of the disc armature/s. In order to utilise the magnetic field of the additional permanent magnet, it is coupled into the radial plane of the disc armature via flux guide plates, between which the at least one disc armature and the at least one stator are arranged. Preferably, the flux guide plates are designed in such a way that the additional magnetic field of the additional permanent magnet is almost completely shielded towards the outside. This can be achieved, for example, in that the flux guide plates have cut surfaces perpendicular to the axis of rotation which cover the cut surfaces of the permanent magnet. Preferably, the flux guide plates connect directly to the additional permanent magnet.

According to a further embodiment, permanent magnets are preferably provided on at least one disc armature, pointing in respectively opposite axial directions, wherein the magnetisation direction of the permanent magnets is identical and the permanent magnets are arranged on the disc armature in respectively axially opposite angular ranges of the disc armature, wherein the at least one disc armature is arranged in the axial direction respectively between two stators and both stators have identically arranged windings which provide an identical phasing of the magnetic rotating field. The density of the magnetically engaged material can be further increased in this configuration of the synchronous machine. As a result, a torque increase by a factor of two can be achieved with almost the same overall size.

A further increase of the torque by a factor of two can be achieved in that at least two rotors configured as disc armatures are provided, with associated stators at an axial distance from each other on the axis of rotation.

If, according to a further embodiment of the synchronous machine, the at least one additional permanent magnet extends radially symmetrically to the axis of rotation, optionally up to the housing cover of the synchronous machine, then a synchronous machine optimised with respect to bearing loads and synchronisation can be provided.

BRIEF DESCRIPTION OF THE DRAWING

In the following, the invention will be explained in more detail with reference to embodiments in conjunction with the drawing. In the drawing.

DETAILED DESCRIPTION

Figure 1:
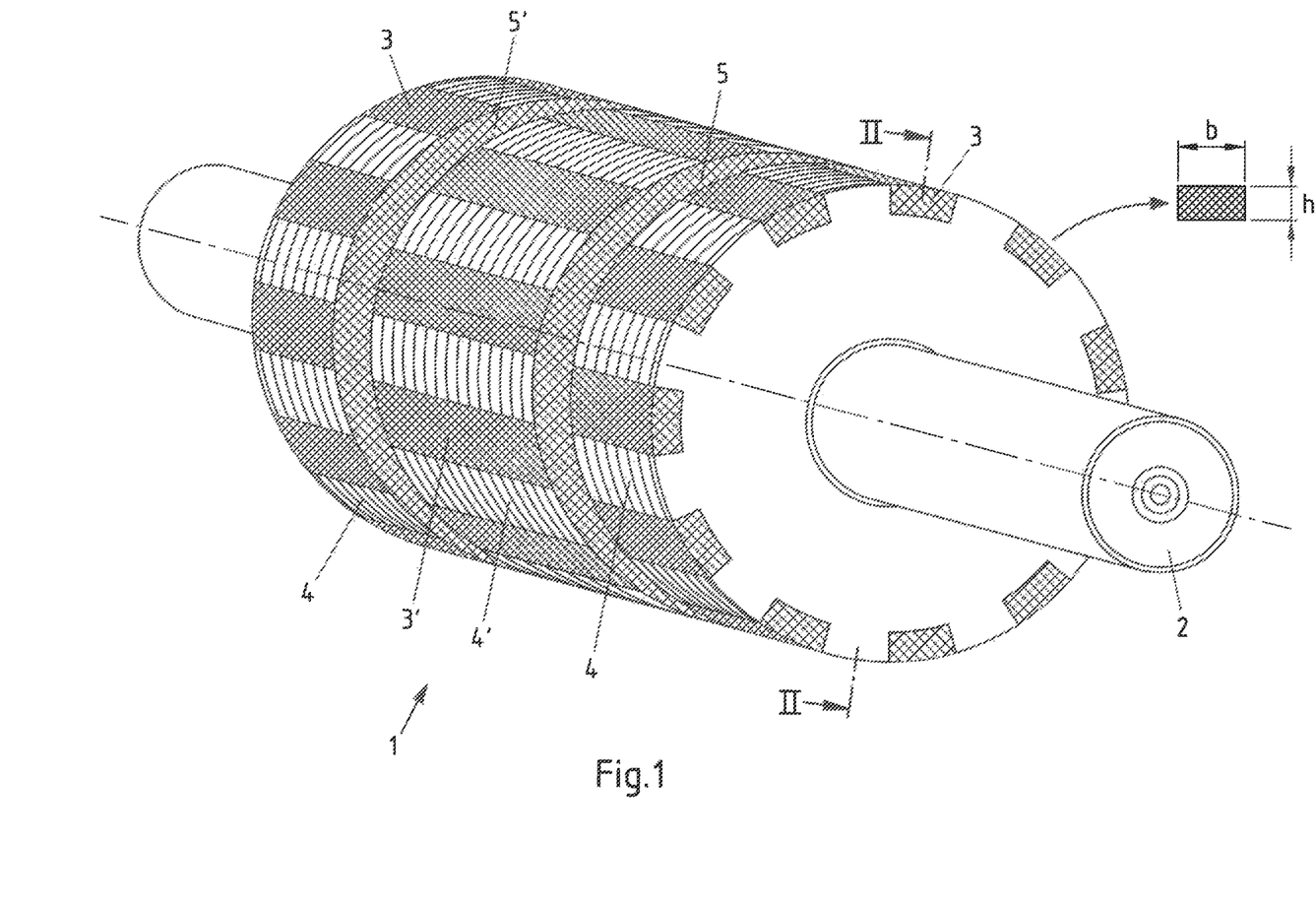
FIG. 1 shows a first embodiment of a rotor of a synchronous machine according to the invention in a schematic, perspective view.

In FIG. 1, a rotor 1 is shown in the form of a cylindrical armature of a first embodiment of the synchronous machine according to the invention. The rotor 1 is arranged on an axis of rotation 2 and has regions with permanent magnets 3, 3', which are arranged facing the at least one stator, not shown in FIG. 1, and distributed in angular ranges in the circumferential direction on the rotor. In addition, flux guide regions 4, 4' are provided on the rotor 1 between the permanent magnets 3, 3', which serve to guide the magnetic flux from or into the rotor 1. The flux guide regions 4, 4' are made of a ferromagnetic, preferably soft-magnetic material. Preferably, the flux guide regions are formed as laminated teeth. In this embodiment, the flux guide regions are laminated perpendicular to the axis of rotation. The stator, not shown in FIG. 1, has n grooves, in which the polyphase, preferably three-phase, winding is wound. With the polyphase winding, which has a number of poles $2p_4$, the stator generates a magnetic rotating field with $2p_2$ magnetic poles, which point in the radial direction in the present embodiment.

In a preferred embodiment, also not shown here, the number of poles of the magnetic rotating field $2p_2$ is twice the number of grooves n and the number of magnetic poles of the rotor $2p_3$ is the difference $2p_2-2p$. As a result, an optimised working range of the synchronous machine is achieved, which is characterised by a reduction of the movement of the rotor and high torques.

According to the invention, an additional permanent magnet 5, 5' is provided in the present embodiment. In the embodiment shown in FIG. 1, the additional permanent magnet in the rotor is provided in the form of two disc-shaped permanent magnets 5, 5'. The magnetic flux of the permanent magnets 5, 5' is guided at least partially via the rotor 1. This guides a magnetic flux in the flux guide regions 4, 4' opposite to the magnetisation direction of the permanent magnets 3, 3' of the rotor, so that in the flux guide regions 4, 4' of the rotor 1, in addition to the magnetic flux generated by the permanent magnets 3, 3', additional flux is guided, which causes a significantly increased flux density in the flux guide regions 4, 4'. The flux density previously present in the flux guide regions 4, 4' was a maximum of approximately the magnetisation of the permanent magnets 3, 3' of 1.4 T. With the additionally guided magnetic flux in the flux guide regions 4, 4', the flux density can be increased up to the saturation region of the ferromagnetic, preferably soft-magnetic, material of the flux guide regions. As a result, the usable torque of the synchronous machine is significantly increased.

Figure 2:
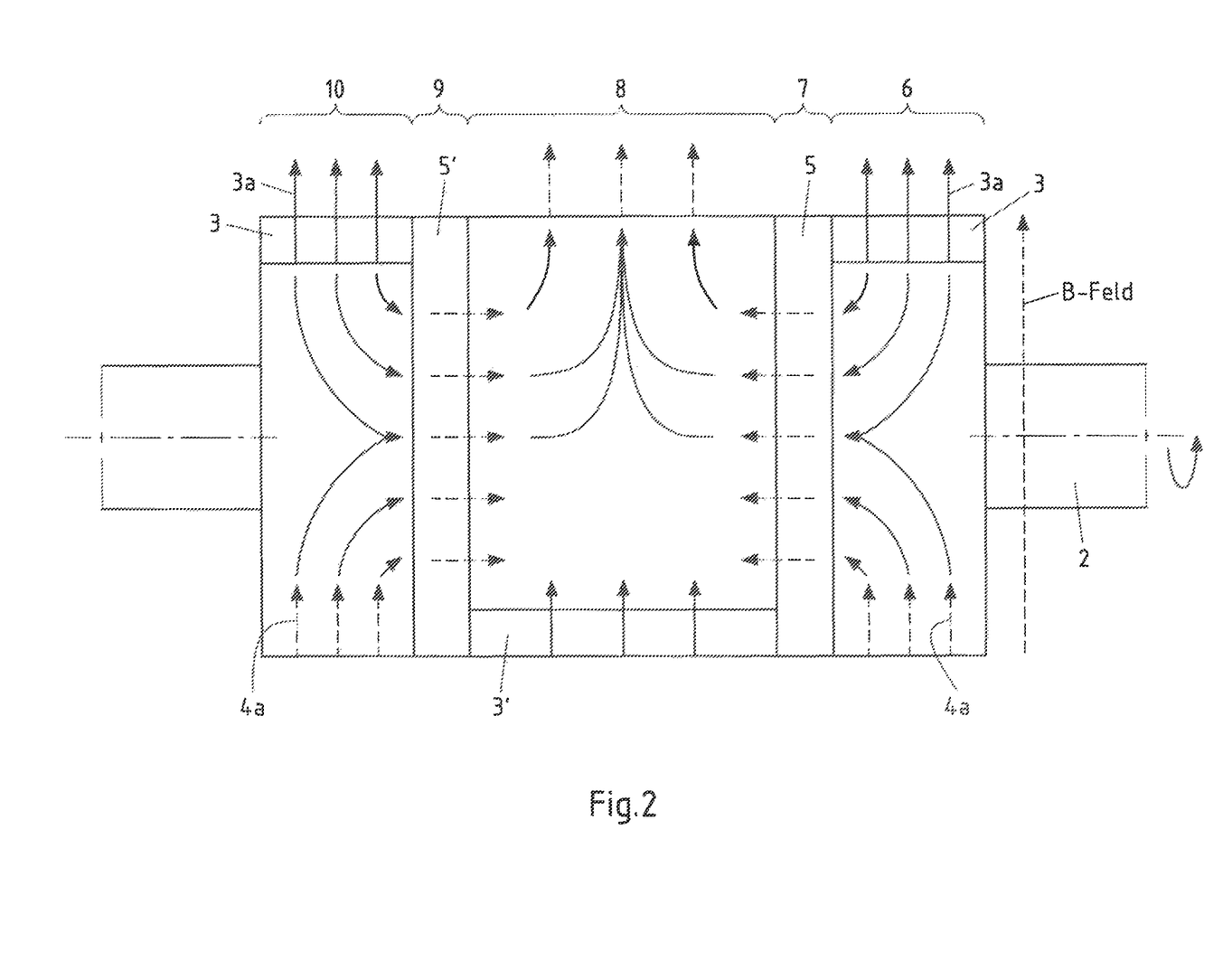
FIG. 2 shows the embodiment of FIG. 1 in a schematic sectional view.

An axial section of the embodiment of FIG. 1 along the axis II-II is shown in FIG. 2. The axis of rotation 2 is shown here schematically, as well as the additional, in this case disc-shaped, permanent magnets 5, 5'. The rotor 1 is, as can also be seen in FIG. 1, divided into five axial regions 6, 7, 8, 9, 10, for example. The rotor 1, which is designed as a cylindrical armature, has, as is also shown in FIG. 1, permanent magnets 3, 3' (3' not shown in FIG. 2) arranged in predetermined angular ranges in the circumferential direction on the lateral surface of the rotor, which extend in the axial direction of the rotor 1. The permanent magnets 3, 3' as well as flux guide regions 4, 4' extend completely over the respective axial region 6, 8 or 10 in the present exemplary embodiment.

In FIG. 2, due to the sectional view, only the permanent magnets 3 of the axial regions 6 and 10 magnetised in the identical direction, here for example radially outward, are shown. In addition to the flux lines, the magnetisation direction of the magnetic rotating field (B field) generated by the stator is also shown. The direction of flux of the magnetic rotating field as well as the flux lines 4a of the flux guide region in the axial region 6, pointing in the direction of the rotor 1, point against the radially outward magnetisation of the permanent magnets 3, which is indicated here by flux lines 3a. In the axial region 6, 8 and 10, the externally applied magnetic rotating field and the flux represented by the flux lines 4a are added in the region of the flux guide regions 4 and 4'. In the region of the permanent magnets 3, 3', the external magnetic field does not penetrate as long as the coercive force of the permanent magnets is not exceeded. This is also the limit of the flux density for the externally applied magnetic rotating field (B field).

However, the magnetic rotating field applied externally by the stator is amplified by the additionally generated flux of the permanent magnets 5, 5' in the flux guide regions 4, 4' and can assume values up to the saturation region of the material of the flux guide regions in the flux guide regions. For example, here up to 2.4 T. The high flux density being present at the flux guide regions leads to correspondingly higher forces, with which these areas follow the magnetic rotating field. As a result, this leads to a significant increase in the torque of the motor.

As can be seen in FIGS. 1 and 2, a second axial region 8 is also provided, in which permanent magnets 3' also extending in the axial direction are provided, which are radially magnetised and are arranged in predetermined angular ranges in the circumferential direction. The flux guide regions 4', which are designed as laminated teeth in the present exemplary embodiment, likewise extend therebetween. The permanent magnets 3' of the second axial region 8 are magnetised in the opposite direction to the permanent magnets 3 of the first axial region 6. This ensures that the flux generated by the additional disc-shaped permanent magnets 5, 5', as shown in FIG. 2, can emerge from the axial region 8 in the radial direction and is nevertheless directed opposite to the magnetisation of the permanent magnets 3' of the lateral surface. A sharp boundary of the flux lines to the flux guide regions 4, 4' is achieved and the flux density is additionally increased by the flux direction being directed respectively opposite to the permanent magnets 3, 3'.

As a result, a significantly higher torque is available. The permanent magnets 3 preferably have a cross-sectional shape, whose width b is twice as large as their height h, and extend over the entire axial region 6, 8, 10. In this way, an advantageous flux profile of the generated magnetic field of the permanent magnets can be achieved. The magnetic field has lower leakage flux in this geometry, for example.

In the previously described embodiment variant of the rotor, the axis of rotation is preferably non-ferromagnetic in order to minimise possible losses due to leakage flux. Optionally, the entire entrance surface of the flux guide regions 4 in the axial region 6 is identical to the surface of the disc-shaped permanent magnet 5, so that an identical flux line density is generated by the additionally induced magnetic flux by means of the permanent magnet 5 in the axial region 6 in the flux guide regions 4. This also applies to the axial region 8, which can then be designed approximately twice as long as the axial regions 6 and 10, as it is flowed through by the magnetic flux of two additional permanent magnets 5, 5'.

Figure 3:
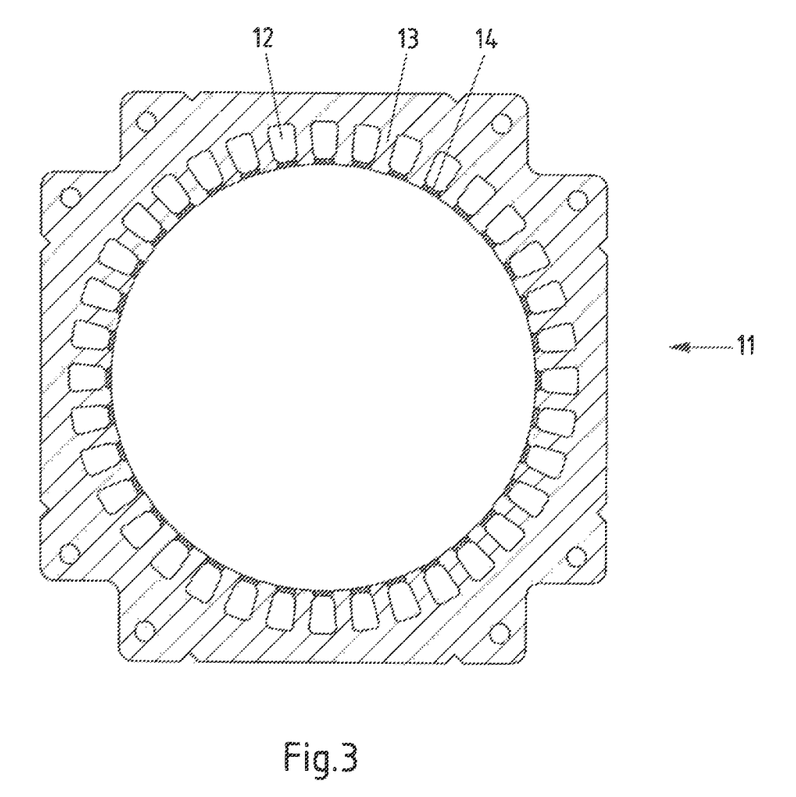
FIG. 3 shows in a sectional view, a stator according to a further embodiment of the invention.

An embodiment of the stator 11 that is advantageous in connection with the exemplary embodiment illustrated in FIGS. 1 and 2 is shown in a schematic sectional view in FIG. 3. The stator 11, which is preferably made of soft-magnetic and optionally laminated steel, has n grooves 12 in which the polyphase, preferably 3-phase, three-phase winding is arranged. Between the grooves, flux guide regions 13 made of soft-magnetic steel are respectively arranged, which serve to guide the flux lines of the magnetic rotating field generated by the stator 11 into the rotor. In order to obtain a concentration of the flux lines to these flux guide regions also in the stator, in the embodiment shown in FIG. 3, additional permanent magnets 14 are arranged in the stator, which limit the flux lines of the magnetic rotating field to the region of the flux guide regions 13 and thus contribute to avoiding leakage flux.

Figure 4:
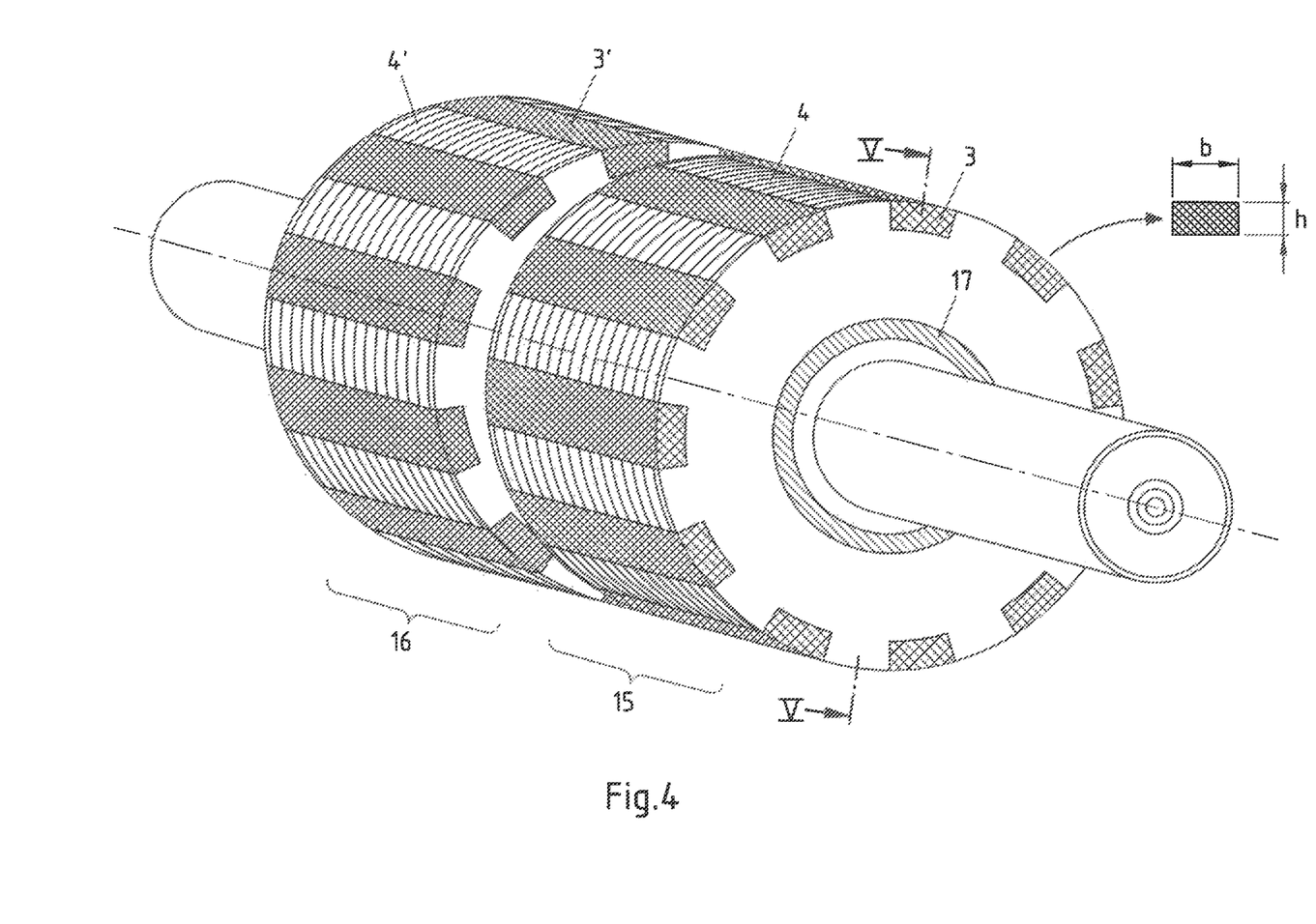
FIG. 4 shows in a perspective view, the rotor of a further embodiment of a synchronous machine according to the invention.

In FIG. 4, a further embodiment of the rotor 1 in the form of a cylindrical armature is shown in a perspective, schematic representation. In the exemplary embodiment in FIG. 4, two axial regions 15, 16 are provided, which have permanent magnets 3, 3' extending in the axial direction and arranged in predetermined angular ranges on the lateral surface of the rotor 1. Also in the initial example in FIG. 4, these axial regions are arranged in such a way that the permanent magnets are rotated respectively against one another such that in the angular range in which, for example, a permanent magnet 3 is provided in the axial region 15, a flux guide region 4' is provided in the axial region 16. In addition, the magnetisation direction of the permanent magnets 3, 3' is opposite to each other.

In contrast to the embodiment of FIGS. 1 and 2, the additional permanent magnet 17 in the embodiment of FIG. 4 and also 5 is designed as a sleeve-shaped or tubular permanent magnet 17, 18 magnetised in the radial direction. The sleeve-shaped or tubular permanent magnet 17, 18 has a smaller radius than the rotor 1 and is thus completely surrounded by the laminated core of the flux guide regions 4, 4'. The magnetisation direction of the sleeve-shaped or tubular permanent magnet 17, 18 is, according to the invention, configured opposite to the magnetisation direction of the permanent magnets of the associated axial region 15, 16, so that in the flux guide regions 4 and 4' respectively a magnetic flux directed respectively opposite to the magnetisation direction of the permanent magnets 3, 3' is produced. As already explained above, this measure can achieve a higher flux density in the area of the flux guide regions. The flux density in the flux guide regions can be increased up to 2.4 Tesla and thus significantly higher torques can be achieved when operating the synchronous machine with identical parameters, such as winding currents.

Figure 5:
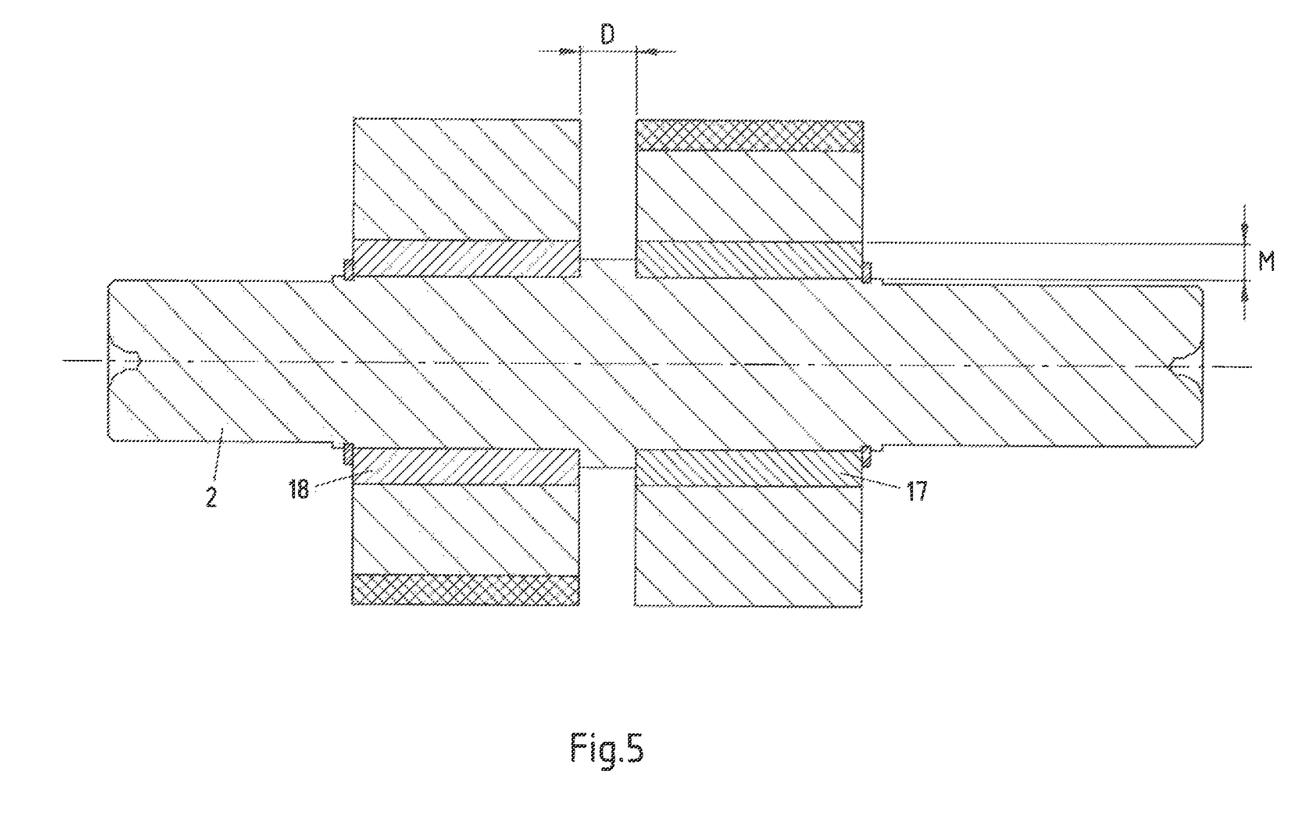
FIG. 5 shows the embodiment of FIG. 4 in a schematic sectional view.

The embodiment of FIG. 4 is additionally shown in FIG. 5 in a schematic sectional view. In the embodiment shown in FIG. 5, the sleeve-shaped or tubular permanent magnet 17, 18 is mounted directly on the axis of rotation 2. In this case, the axis of rotation 2 should comprise a ferromagnetic material in order to allow a magnetic closure in the simplest possible way. To avoid leakage flux, both the thickness M of the sleeve-shaped or tubular permanent magnet 17, 18 as well as the distance D between the two axial regions 15, 16 should be 10 to 30 times, preferably 20 times, the air gap between the rotor and stator. As a result, leakage flux can be reduced.

Figure 6:
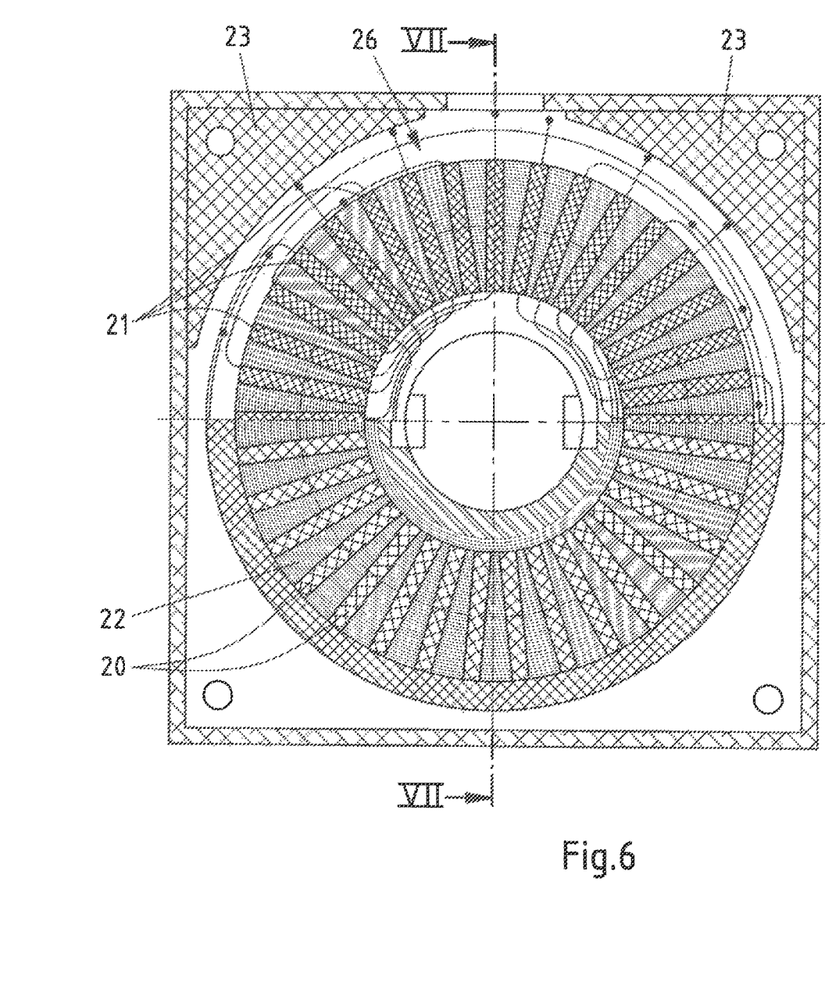
FIG. 6 shows a further embodiment of a synchronous machine according to the invention in a sectional view in the radial plane.
Figure 7:
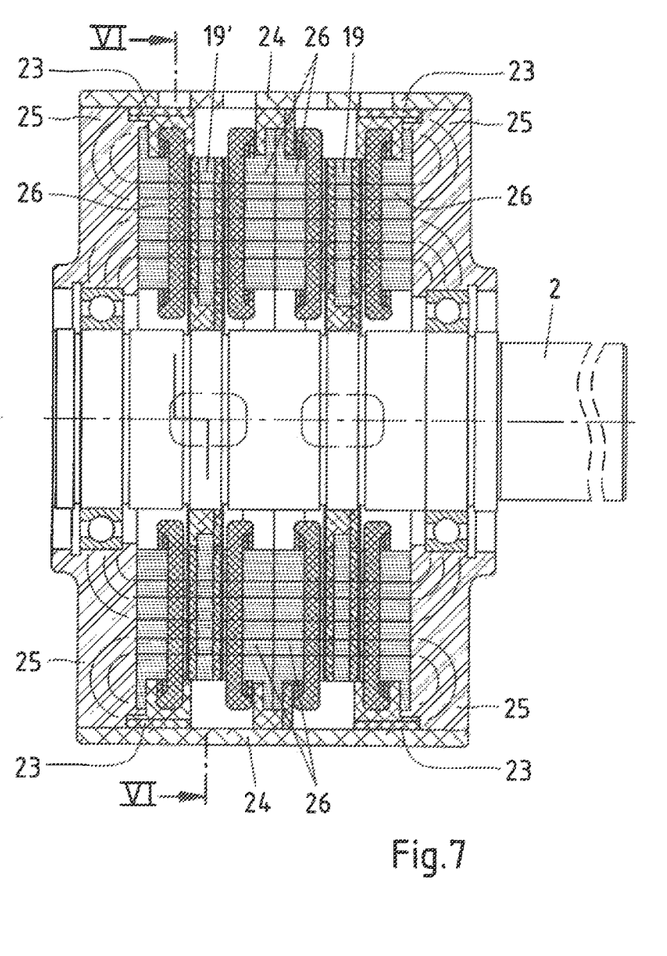
FIG. 7 shows the embodiment of FIG. 6 in an axial sectional view.

In addition, in FIGS. 6 and 7, a further alternative embodiment of the synchronous machine according to the present invention is shown. Here, the rotor is formed as a disc armature 19, 19' and has a plurality of angular ranges, in which permanent magnets 20 are arranged, which extend radially inwardly. The permanent magnets 20 are magnetised in the axial direction. Each disc armature 19, 19' in the present exemplary embodiment has permanent magnets 20 on both sides of the rotor sheath, i.e. pointing in both axial directions.

The three-phase winding 21, illustrated in the present embodiment in FIG. 6, of the at least one stator 26 has a winding surface normal, which points in the axial direction, so that the at least one stator 26 generates a magnetic rotating field with magnetic poles pointing in the axial direction. Between the permanent magnets 20 of the disc armature 19, flux guide regions 22 are provided which have ferromagnetic, preferably soft-magnetic, material and are designed in particular in a laminated form. The flux guide regions of the disc armature 19, 19' and the associated stators 26 are preferably laminated in the axial direction.

In addition, at least one permanent magnet 23 is provided, which preferably extends over the entire housing of the synchronous machine. This is magnetised in the axial direction and generates additional magnetic flux in the region of the disc armature 19, 19'. The magnetic flux lines of the additional permanent magnet 23 are coupled via flux guide plates 25 made of ferromagnetic or soft-magnetic material with minimal leakage flux in the radial plane of the disc armature 19, 19'. The flux lines of the permanent magnet are indicated in FIG. 7. The permanent magnet 23 is preferably formed radially symmetrical to the axis of rotation 2, in order to achieve a uniform flux density increase in the flux guide regions.

The axis of rotation 2 and a housing cover 20 extending in an axial direction are made of non-ferromagnetic material. This ensures that the magnetic flux generated by the additional permanent magnets 23 flows through the disc armature 19 as strongly as possible and is not contained via the axis of rotation 2 or the housing cover 20.

Preferably, as shown in FIG. 7, two stators 26 are respectively associated with a disc armature 19, which have identical windings 21, and can provide an identical phasing of the rotating magnetic field. As a result, the throughflow of the disc armature 19, 19' can be increased and thus also the torque of the synchronous machine.

As can be seen in FIG. 7, two disc armatures 19, 19', which are arranged at an axial distance on the axis of rotation 2, are arranged on the axis of rotation. Each disc armature 19, 19' is associated with respectively two stators 26 here.

In FIG. 6, the permanent magnet 23 is shown, which additionally provides magnetic flux in the disc armature 19, 19'. Preferably, the at least one additional permanent magnet 23 is configured radially symmetrically to the axis of rotation and optionally extends to the housing cover 20 of the synchronous machine. The permanent magnet 23 preferably has an identical cross-sectional surface perpendicular to the axis of rotation 2 as the flux guide regions of the disc armature 19, 19'. The additional magnetic flux which the permanent magnet 23 provides to the disc armature 19, 19', can be influenced via the cross-sectional surfaces.

The synchronous machine shown in FIGS. 6 and 7 has a particularly high density of magnetically engaged material due to the use of two disc armatures 19, 19' with permanent magnets 20 and stators 26 respectively arranged on both sides, so that the torque of the synchronous machine is increased by almost a factor of 4 compared to similar overall sizes.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A synchronous machine, comprising:
at least one stator with a polyphase winding with a number of poles 2p>4, wherein a number of poles is twice a number of pole pairs p, the winding is arranged in n grooves in the at least one stator and designed to generate a magnetic rotating field, flux guide regions provided between the grooves of the at least one stator for guiding the magnetic rotating field, which comprise a ferromagnetic material, at least one rotor arranged on an axis of rotation, which is relatives to at least one stator, rotatably arranged forming an air gap and the at least one rotor has regions with permanent magnets facing towards the at least one stator and the permanent magnets are arranged evenly distributed in angular ranges in the circumferential direction with respect to the direction of rotation of the rotor, wherein the permanent magnets are magnetized in a direction of the flux guide regions of the at least one stator or in the opposite direction thereto, wherein the at least one rotor has flux guide regions arranged between the permanent magnets, the flux guide regions serve to guide the magnetic flux from or into the at least one rotor, wherein the flux guide regions of the at least one rotor comprise a ferromagnetic material, wherein the at least one rotor is provided with at least one additional permanent magnet with a generated magnetic flux that is at least partially guided via the flux guide regions of the rotor, wherein the magnetic flux of the additional permanent magnet in the flux guide regions of the rotor has a direction opposite to the magnetization direction of the permanent magnets of the rotor, and wherein a number of magnetic poles of the rotating field $2p_2$ is twice a number of grooves n of the at least stator, and a number of magnetic poles of the at least one rotor $2p_3$ is:

$$2p_3 = 2p_2 - 2p$$

where 2p is the number of poles of the at least one stator, and $2p_2$ is the number of magnetic poles of the rotating field of the at least one rotor.

2. The synchronous machine according to claim 1, wherein the winding of the at least one stator is configured as a three-phase winding.

3. The synchronous machine according to claim 1, wherein the flux guide regions in the at least one stator and/or in the rotor are of a laminated design.

4. The synchronous machine according to claim 1, wherein the number of holes q of the winding of the stator is at least 1.5.

5. The synchronous machine according to claim 1, wherein the at least one rotor is designed as a cylindrical armature arranged on an axis of rotation and the at least one stator is designed to generate a radial magnetic rotating field in the at least one rotor, wherein the at least one rotor has permanent magnets in a first axial region which are provided in predetermined angular ranges on the lateral surface of the at least one rotor and extend in the axial direction of the at least one rotor, wherein the permanent magnets of the at least one rotor are magnetised in the radial direction or opposite thereto, flux guide regions are respectively arranged between the permanent magnets of the at least one rotor, which form an air gap to the flux guide regions of the at least one stator in the radial direction.

6. The synchronous machine according to claim 5, wherein in at least one stator, evenly distributed angular ranges are provided with permanent magnets, which are magnetised in the direction of the at least one rotor or in the opposite direction and which are arranged respectively adjacent to the flux guide regions of the at least one stator.

7. The synchronous machine according to claim 5, wherein the at least one rotor has at least two axial regions, wherein permanent magnets are provided in at least one first axial region, which extend in the axial direction and are magnetised in the radial direction or opposite thereto, in predetermined angular ranges in the circumferential direction, and between the permanent magnets flux guide regions are respectively provided and in at least one second axial region permanent magnets are provided, which extend in the axial direction and are magnetised in the radial direction or opposite thereto, in predetermined angular ranges in the circumferential direction, and between the permanent magnets flux guide regions are respectively provided, wherein the magnetisation direction of the permanent magnets in the first axial region is opposite to the magnetisation direction of the permanent magnets arranged in the second axial region and the permanent magnets of the at least one second axial region are arranged in angular ranges in the circumferential direction, in which flux guide regions are provided in the first axial region, wherein the flux guide regions of the axial regions of the at least one rotor form an air gap to the at least one stator.

8. The synchronous machine according to claim 5, wherein in at least one further axial region of the at least one rotor, which directly adjoins the first or second axial region in the axial direction and/or is arranged between the first and second axial region with radially magnetised permanent magnets, at least one additional permanent magnet is provided, which is magnetised in the axial direction such that a magnetic flux is generated in the flux guide regions of the first and/or second axial region of the at least one rotor opposite to the magnetisation direction of the permanent magnets of the respective axial region, wherein the axis of rotation consists of non-ferromagnetic material and the at least one further axial region is optionally disc-shaped.

9. The synchronous machine according to claim 5, wherein in at least one first and/or second axial region of the at least one rotor, at least one permanent magnet is provided, which is designed as a cylindrical sleeve or tube magnetised in the radial direction, wherein the sleeve-shaped or tubular permanent magnet has a smaller outer radius than the at least one rotor itself and is magnetised radially opposite to the magnetisation direction of the permanent magnets arranged on the lateral surface of the at least one rotor, wherein the axis of rotation optionally comprises ferromagnetic material.

10. The synchronous machine according to claim 9, wherein the axial regions of the armature are arranged separated from each other by a gap in the axial direction.

11. The synchronous machine according to claim 1, wherein the at least one rotor is designed as a disc armature and has a plurality of angular ranges, in which permanent magnets are provided, wherein the permanent magnets are magnetised in the axial direction and extend in the radial direction on the rotor disc, the winding of the at least one stator has a winding surface normal pointing in the axial direction, so that the at least one stator generates a magnetic rotating field with poles pointing in the axial direction, and at least one additional permanent magnet is provided, which is magnetised in the axial direction and provides magnetic flux in the region of the disc armature, wherein the magnetic field is coupled into the radial plane of the disc armature, the axis of rotation and a housing cover of the synchronous machine, said housing cover extending in the axial direction, comprise a non-ferromagnetic material and the at least one disc armature and at least one stator are arranged between two flux guide plates extending in the radial direction and made of ferromagnetic material, which are provided for flux guidance of the magnetic flux of the additional permanent magnet.

12. The synchronous machine according to claim 11, wherein the flux guide regions of the at least one stator and of the at least one rotor have a ferromagnetic material laminated in the axial direction.

13. The synchronous machine according to claim 11, wherein on at least one disc armature permanent magnets are provided, pointing in respectively opposite axial directions, wherein the magnetisation direction of the permanent magnets is identical and the permanent magnets are arranged on the disc armature in respectively axially opposite angular ranges of the disc armature, wherein in the axial direction the at least one disc armature is arranged respectively between two stators and both stators have identically arranged windings which provide an identical phasing of the magnetic rotating field.

14. The synchronous machine according to claim 11, wherein at least two rotors, designed as disc armatures, having associated stators, are provided at an axial distance from each other on the axis of rotation.

15. The synchronous machine according to claim 11, wherein the at least one additional permanent magnet extends radially symmetrically to the axis of rotation, optionally up to the housing cover of the synchronous machine.

* * * * *